No. 755,244. PATENTED MAR. 22, 1904.
W. A. & J. RIDDELL.
DEVICE FOR SEPARATING FLUE DUST FROM GAS.
APPLICATION FILED JULY 25, 1903.
NO MODEL. 4 SHEETS—SHEET 1.
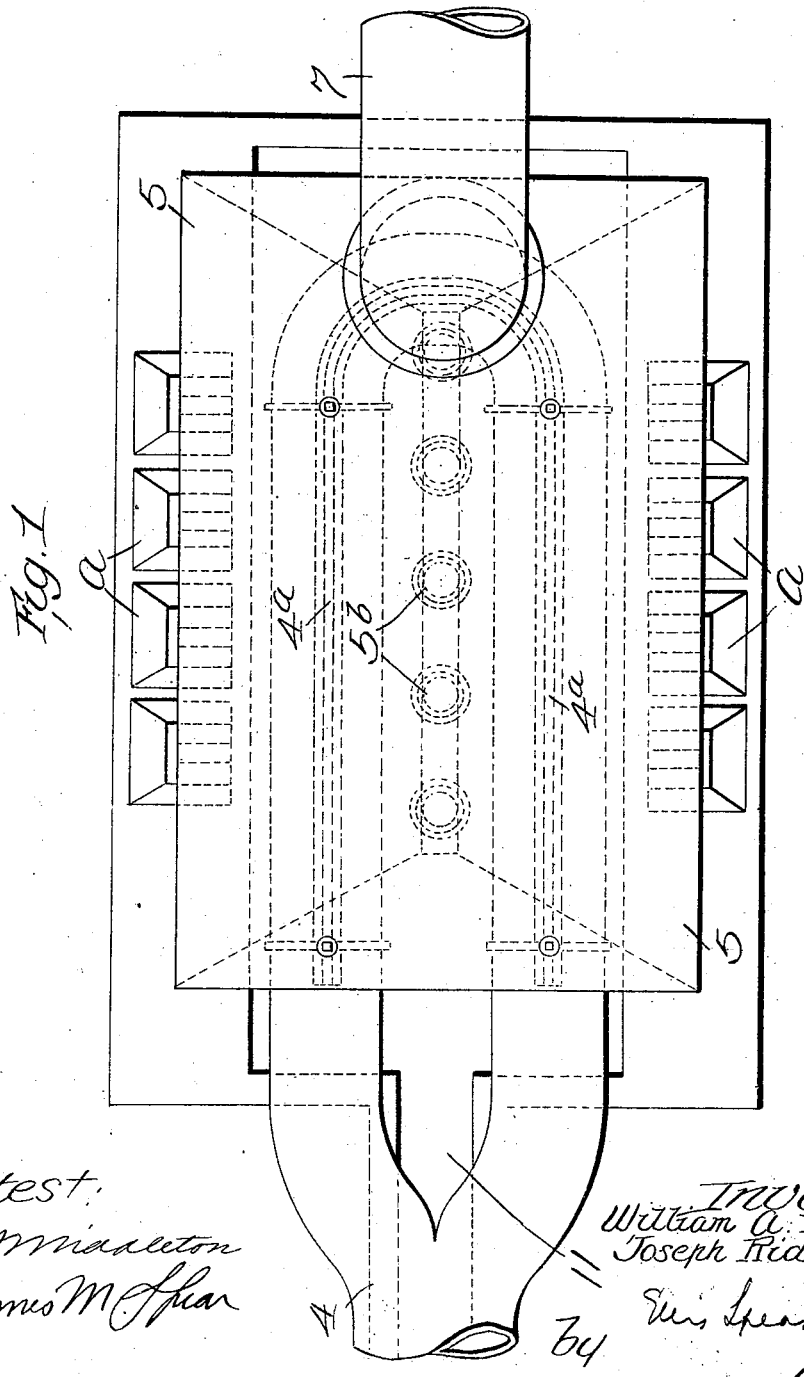

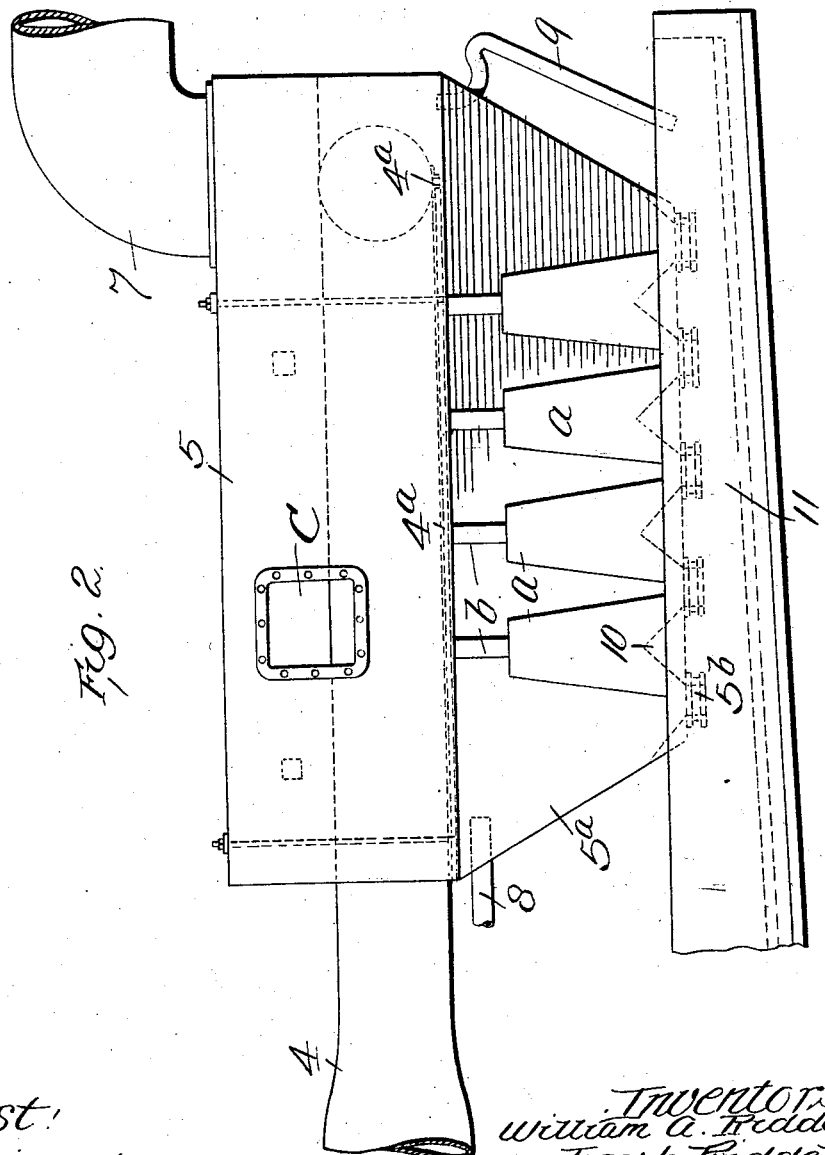

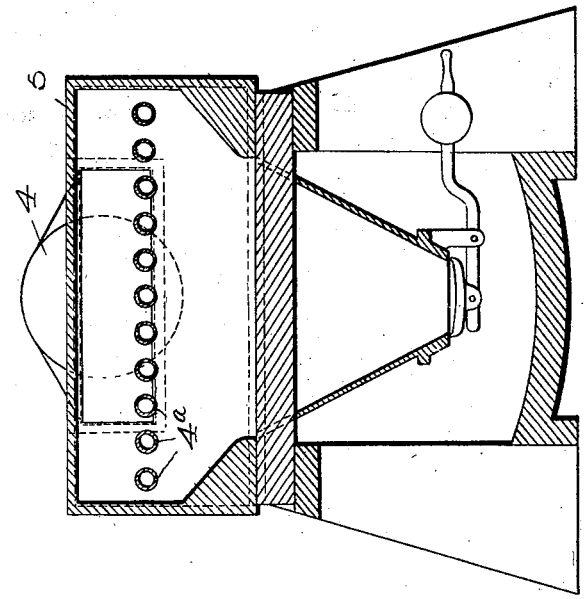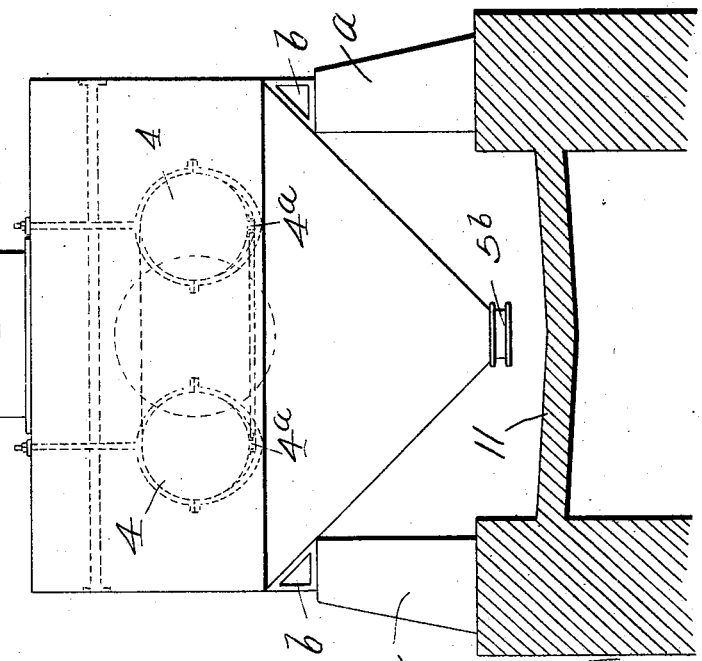

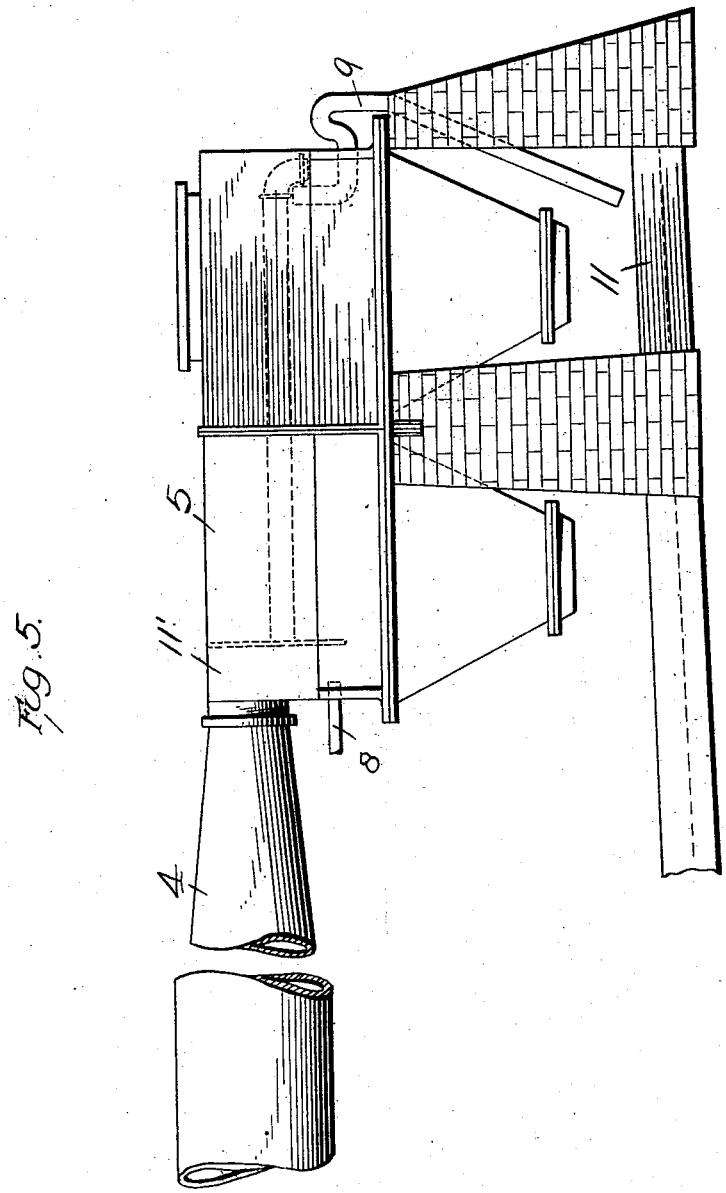

No. 755,244. Patented March 22, 1904.

UNITED STATES PATENT OFFICE.

WILLIAM A. RIDDELL AND JOSEPH RIDDELL, OF SHARON, PENNSYLVANIA.

DEVICE FOR SEPARATING FLUE-DUST FROM GAS.

SPECIFICATION forming part of Letters Patent No. 755,244, dated March 22, 1904.

Application filed July 25, 1903. Serial No. 167,051. (No model.)

*To all whom it may concern:*

Be it known that we, WILLIAM A. RIDDELL and JOSEPH RIDDELL, citizens of the United States, residing at Sharon, Mercer county, Pennsylvania, have invented certain new and useful Improvements in Devices for Separating Flue-Dust from Gas, of which the following is a specification.

My invention relates to improvements in devices for extracting the small particles of ore, commonly known as "flue-dust," which are blown out of a blast-furnace by the blast from the blowing-engine and carried with the gas through the down-comer into the flues and then into the stoves and boilers where they accumulate to the great injury of these parts, causing detrimental working of these parts; and the object of the invention is to provide a simple and effective construction which will effectually separate the flue-dust without in any way interfering with the blast.

The invention includes the construction and arrangement of parts hereinafter described, and particularly pointed out in the claims.

We have illustrated the invention in the accompanying drawings, in which—

Figure 1 is a plan view; Fig. 2, a side elevation; and Fig. 3 an end view, partly in section. Fig. 4 is a sectional view, and Fig. 5 a side elevation, of a modified form.

Referring more particularly to the figures, the numeral 4 describes the pipe which communicates with the down-comer, and the numeral 5 an elongated tank from which a gas-outlet pipe 7 leads away the purified gas to the hot-blast pipes. As the down-comer and the blast-pipe form no part of the present invention and are well known to those skilled in the art, illustration thereof is deemed unnecessary, the present invention relating solely to the separator.

The tank 5 just referred to is preferably made rectangular, as shown, and is provided with a substantially V-shaped bottom portion $5^a$, provided at the apex with a plurality of valved openings $5^b$, through which the separated particles of ore or flue-dust may be removed from time to time. The tank is provided with a water-inlet pipe 8 and a water-overflow pipe 9, by which the water-level in the tank is maintained in close proximity to the under side of the pipe 4. The pipe 4 is preferably formed where it enters the tank in looped shape and is provided on its under side with a narrow slot $4^a$, which extends along both branches of the loop and around the curved end. The slot is of such width and length as to correspond to the capacity of the pipe 4, and it will thus be seen that the blast of gas passing through the pipe 4 will be directed downward in a thin stream directly against the surface of the water within the tank. The result of this is that all of the gas will impinge directly against the surface of the water and every particle of flue-dust be brought in contact with the water and be precipitated thereby to the bottom of the tank, while at the same time a minimum amount of resistance is caused to the passage of the gas. The bottom of the tank is preferably provided with inclined walls extending transversely of the tank, as indicated at 10, which causes all the precipitated particles to settle directly above the outlet-valves $5^b$, and a channel 11, provided beneath the outlet-valves and having an inclined bottom, receives the waste water from the pipe 9, which washes away the sediment discharging through the valves $5^b$. We prefer to support the tank in the manner illustrated in the drawings by concrete pillars $a$ and triangular iron brackets $b$, as shown. We may also provide a manhole for access to the tank, as indicated at C.

Instead of having a single large pipe we may use a plurality of smaller pipes arranged in a horizontal plane, as shown in Figs. 4 and 5. In this form the pipe 4 communicates with a compartment or chamber 11' in the end of the tank 5, from which compartment a plurality of horizontally-disposed pipes lead forward into proximity to the opposite end of the tank. These have each a narrow slot extending the entire length of the under side similar to, but smaller, of course, than the slot in the large pipe shown in the first form described. If desired, the ends of these pipes instead of being closed may be turned downwardly, so as to be submerged in the water.

Having thus described our invention, what we claim is—

1. A device for separating flue-dust from the gas coming from a blast-furnace, comprising a closed tank having a water-inlet and a water-outlet whereby water is maintained in said tank at a determined level, a pipe extending horizontally in said tank slightly above said water-outlet, said pipe being stationary and having an opening in its lower side only directed against the surface of the water, a gas-inlet to the pipe and a gas-outlet from the tank, substantially as described.

2. In combination, a tank containing water, a pipe extending horizontally at a slight distance above the level of the water in said tank and having an elongated opening or slot extending longitudinally in its under side, a gas-inlet to the pipe and a gas-outlet from the tank, the gas issuing from the elongated opening having to cross a free space to reach the surface of the water, substantially as described.

3. In combination, a tank having a contracted lower portion, a water-inlet and a water-outlet from said tank arranged to maintain water therein at a predetermined level, a horizontally-disposed gas-supply pipe located in said tank with a gas-exit in its lower side, a gas-outlet from said tank above the water-level, means at the bottom of said tank for delivering the sediment from the tank, and a trough into which the sediment is delivered, the overflow-pipe from the tank emptying into said trough, substantially as described.

In testimony whereof we affix our signatures in presence of two witnesses.

WILLIAM A. RIDDELL.
JOSEPH RIDDELL.

Witnesses:
A. W. WILLIAMS,
K. H. BUNDEL.